United States Patent [19]

Kotera et al.

[11] 4,225,950
[45] Sep. 30, 1980

[54] AUTOMOBILE DISTANCE MEASURING APPARATUS

[75] Inventors: Masao Kotera; Yoshiyuki Kago, both of Okazaki, Japan

[73] Assignee: Nippon Soken, Inc., Nishio, Japan

[21] Appl. No.: 930,017

[22] Filed: Aug. 1, 1978

[30] Foreign Application Priority Data

Sep. 2, 1977 [JP] Japan .................. 52-106018

[51] Int. Cl.² ............................................. G01S 9/68
[52] U.S. Cl. ............................. 367/97; 343/7 VM; 367/96; 367/108
[58] Field of Search .................. 340/1 R, 1 C, 3 C; 343/7 VM; 367/96, 97, 108

[56] References Cited

U.S. PATENT DOCUMENTS

| | | | |
|---|---|---|---|
| 3,428,139 | 2/1969 | Nolan | 367/114 |
| 3,431,550 | 3/1969 | Spence | 367/97 X |
| 3,624,596 | 11/1971 | Dickenson et al. | 367/114 |
| 3,710,310 | 1/1973 | Moss, Jr. et al. | 367/108 X |

*Primary Examiner*—Richard A. Farley
*Attorney, Agent, or Firm*—Cushman, Darby & Cushman

[57] ABSTRACT

A distance measuring apparatus installed in an automobile to measure with a high degree of accuracy a distance between a road surface and the axle of vehicle body of the automobile in motion. With this distance measuring apparatus, the distance between the point of its installation on the automobile and the road surface is measured by transmitting wave signals from the point of installation toward the road surface, selecting only the reflected wave signals of a predetermined intensity from the received reflected wave signals from the road surface and then integrating and averaging the data of the distance to the road surface derived from the selected reflected wave signals.

2 Claims, 4 Drawing Figures

AUTOMOBILE DISTANCE MEASURING APPARATUS

BACKGROUND OF THE INVENTION

1. Field of the Invention

The present invention relates to a distance measuring apparatus installed in an automobile to measure, for example, the distance between the road surface and the axle or vehicle body of the running automobile so as to measure the degree of inclination of the automobile or the degree of lowering of the vehicle body and thereby to detect the tire air pressure or control the optical axis of the head lamps.

2. Description of the Prior Art

Generally, ordinary distance measuring apparatus are so constructed that the apparatus comprises means for transmitting a sound wave, means for receiving the reflected sound wave from an object to be measured and means for measuring the distance to the object from the time elapsed between the transmission of the sound wave and the reaction of the reflected sound wave. To simply use this type of measuring apparatus as an automobile distance measuring apparatus which measures the degree of inclination of the automobile or the degree of lowering of the vehicle body to detect the air pressure of the tires or control the optical axis of the head lamps, a measuring accuracy of the order of $10^{-3}$ m is required. However, if the ordinary measuring apparatus is simply used to measure the distance between the axle or the vehicle body of an automobile and the road surface, the intensity of the reflected sound wave varies depending on the road surface conditions and the resulting measuring accuracy will be as low as about $10^{-2}$ m, thus making it impossible to use the apparatus in practical applications, such as, the detection of the tire air pressure, the control of the head lamp optical axis or the like.

SUMMARY OF THE INVENTION

It is an object of the present invention to provide an automobile distance measuring apparatus which ensures a required accuracy of measurement.

It is another object of the present invention to provide an automobile distance measuring apparatus which is capable of measuring the distance between the road surface and the axle or vehicle body of the automobile in motion with a high degree of accuracy and without being affected by the road conditions.

In accordance with the present invention, there is thus provided an automobile distance measuring apparatus comprising means for transmitting sound waves from one end of an automobile toward the road surface and receiving the reflected wave signals from the road surface, means for selecting only the wave signals of a predetermined intensity from the reflected wave signals from the road surface, and means for integrating and averaging the measured distance data derived from the reflected wave signals of the predetermined intensity, whereby the distance between the road surface and one end, e.g., the axle or vehicle body of the automobile in motion can be measured with a greater accuracy and without being affected by the road conditions, thus making it possible to measure the tire air pressures or their balance, control the optical axis of the head lamps in response to variation in the degree of inclination of the automobile and so on.

DESCRIPTION OF THE PREFERRED EMBODIMENTS

Figure 1:
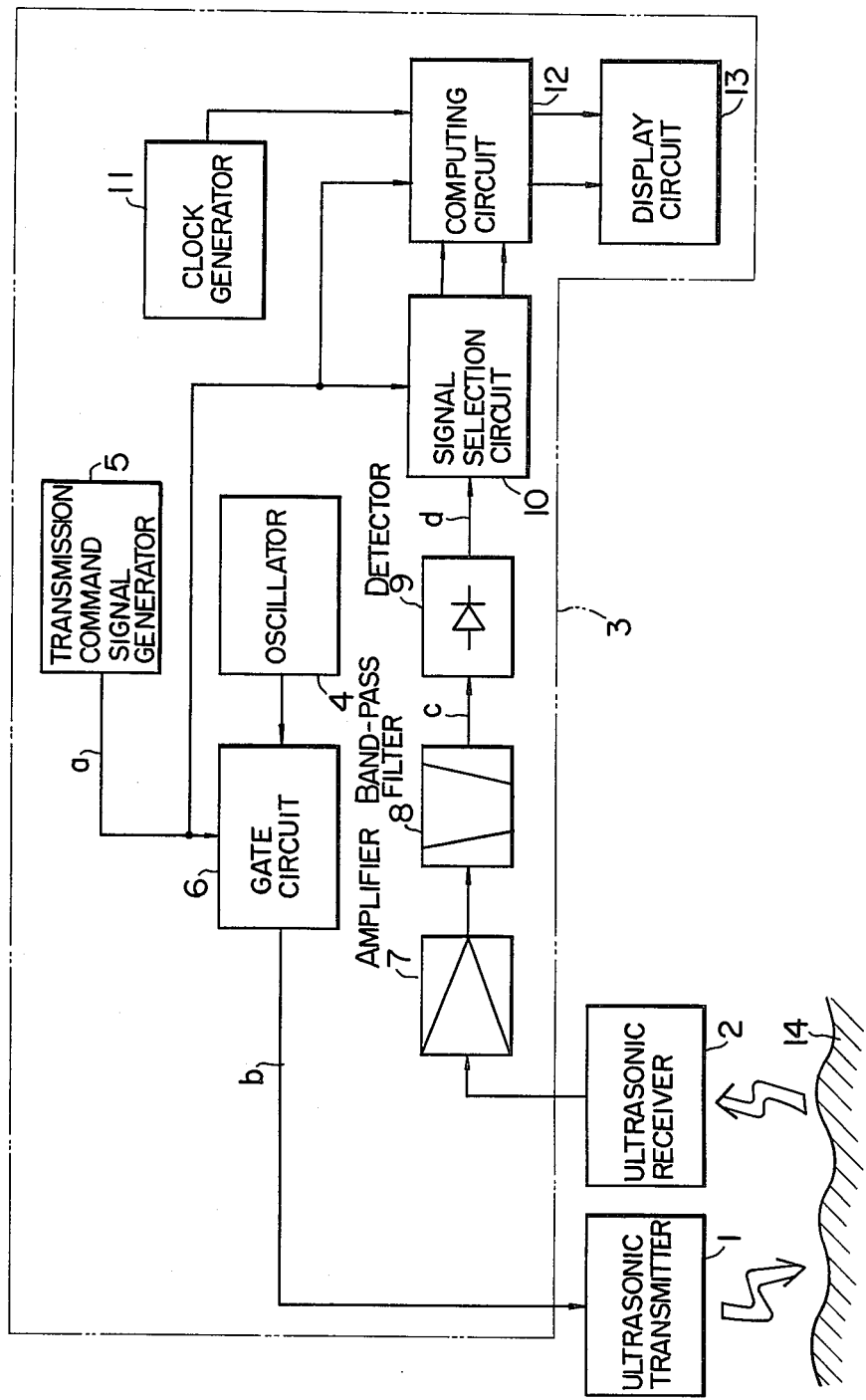
FIG. 1 is a block diagram showing an embodiment of an automobile distance measuring apparatus according to the present invention.
Figure 2:
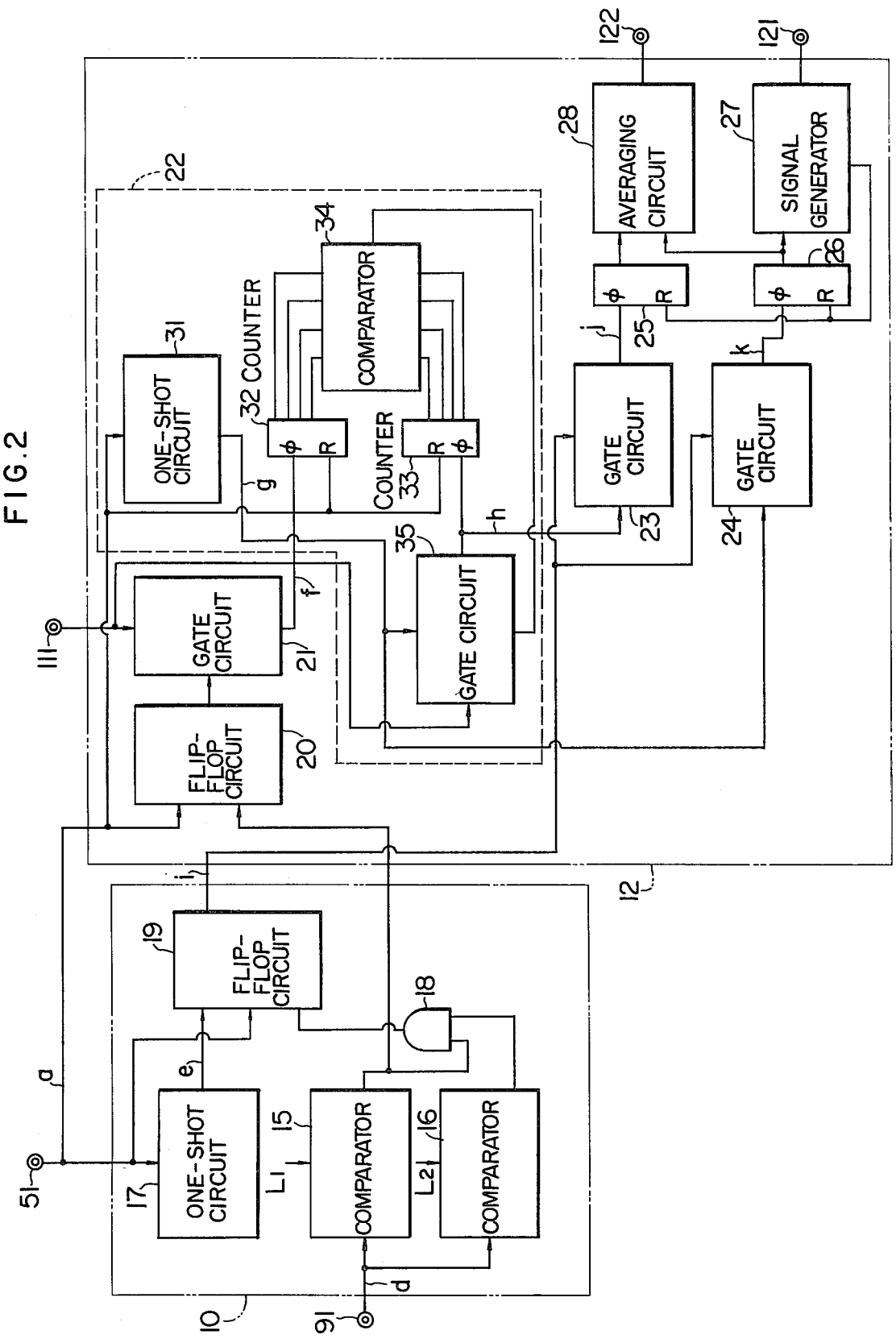
FIG. 2 is a block diagram showing in detail the construction of the computing circuit and the signal selection circuit used in the apparatus of this invention.

Referring now to FIG. 1 illustrating an embodiment of the invention, numerals 1 and 2 designate an ultrasonic transmitter and receiver which are mounted on the axle or vehicle body of an automobile which is shown to transmit an ultrasonic wave as a wave signal vertically toward the road surface and receive the wave signal reflected from the road surface, and 3 a distance measuring circuit connected to the ultrasonic transmitter 1 and the ultrasonic receiver 2 to measure the distance to the road surface. The distance measuring circuit 3 comprises an oscillator 4 for driving the ultrasonic transmitter 1, a transmission command signal generator 5 for generating pulse-type transmission command signals a to interrupt the output of the oscillator 4 at a predetermined period, a gate circuit 6 for receiving the transmission command pulse signals a from the transmission command signal generator 5 to interrupt the output of the oscillator 4 at the predetermined period and thereby to apply driving signals b to the ultrasonic transmitter 1, an amplifier 7 for amplifying the signals reflected from a road surface 14 and received by the ultrasonic receiver 2, a band-pass filter 8 for selecting and passing only the signals of a predetermined frequency band from the output of the amplifier 7, a detector 9 for subjecting the output signal c of the band-pass filter 8 to envelope detection, a signal selection circuit 10 for generating an integration command only when the output d of the detector 9 has a predetermined magnitude, a clock generator 11 for generating clock pulses at a predetermined frequency, a computing circuit 12 for counting the clock pulses from the clock generator 11 during every time interval between the transmission of an ultrasonic wave signal from the ultrasonic transmitter 1 and the reception of the reflected wave signal from the road surface 14 and for averaging the count in response to the integration command signal from the signal selection circuit 10, and a display circuit 13 for displaying the content of the computing circuit 12. As shown in FIG. 2, the signal selection circuit 10 comprises comparators 15 and 16 for respectively comparing the output signal d of the detector 9 with predetermined levels $L_1$ and $L_2$, a logic circuit 18 responsive to the outputs of the comparators 15 and 16 to generate an output signal only when the output signal d has a magnitude between the predetermined levels $L_1$ and $L_2$, a one-shot circuit 17 for generating a signal of a predetermined pulse width $T_{17}$ in synchronism with the transmission command signal a from the transmission command signal generator 5, and a flip-flop circuit 19 for applying an integration command signal to the computing circuit 12. Also as shown in FIG. 2, the computing circuit 12 comprises a flip-flop circuit 20 for generating a pulse signal of a time width corresponding to the time interval between the transmission of an ultrasonic wave signal and the reception of the reflected wave signal, a gate circuit 21 for passing the clock pulses applied from the clock generator 11 only for the duration time of the pulse signal generated from the flip-flop circuit 20, a memory circuit 22 for counting and storing the clock pulses f from the gate circuit 21 and the transmission command signals a from the transmission command signal generator 5, gate circuits 23 and 24 responsive to the signal from the flip-flop circuit 19 of the signal selection circuit 10 to pass the number of clock pulses and the number of transmissions stored in the memory circuit 22, counters 25 and 26 for respectively integrating the output signals j and k of the gate circuits 23 and 24, a signal generator 27 for generating a latch signal as well as a reset signal for resetting the counters 25 and 26 in response to each predetermined number of times of data integration, and an averaging circuit 28 whereby the output of the counter 25 indicative of the integrated value of the distance clock pulses is divided by the output of the counter 26 indicative of the number of times of data integration so as to generate the resulting average value. The memory circuit 22 comprises a one-shot circuit 31 for generating a signal g of a predetermined pulse width $T_{31}$ in synchronism with the transmission command signal a from the transmission command signal generator 5, a counter 32 for counting the clock pulses f from the gate circuit 21, a counter 33 for reading out the count of the counter 32, a comparator 34 for comparing the outputs of the counters 32 and 33 to generate a logical value "D" when there is equality between the counter outputs, and a gate circuit 35 for passing the distance clock pulses only when the output of the comparator 34 is "1", i.e., the outputs of the counters 32 and 33 are not equal and when the output signal g of the one-shot circuit 31 has a predetermined logical value.

With the construction described above, the operation of this embodiment will now be described with reference to the signal waveform diagram of FIG. 3. In the Figure, the waveforms (a) to (k) respectively correspond to the waveforms of the signals a to k shown in FIGS. 1 and 2. The gate circuit 6 is opened in response to a transmission command signal a of the predetermined period or frequency applied from the transmission command signal generator 5, so that the output of the oscillator 4 is applied as a signal b to the ultrasonic transmitter 1 through the gate circuit 6 and the resulting ultrasonic pulse signal is transmitted toward the road surface 14. The reflected ultrasonic pulse signal from the road surface 14 is received by the ultrasonic receiver 2 after the expiration of a time t proportional to the distance to the road surface 14, and only the desired frequency components of the received reflected wave is amplified and passed by the amplifier 7 and the band-pass filter 8. The resulting signal c is subjected by the detector 9 to envelope detection and the resulting detection signal d is delivered to a terminal 91. The detection signal d is applied to the signal selection circuit 10 where the signal is compared with predetermined detection levels $L_1$ and $L_2$ ($L_1 < L_2$) through the comparators 15 and 16. On the other hand, the transmission command signal a is applied to the signal selection circuit 10 through a terminal 51, and thus a pulse signal e generated in synchronism with the signal a and assuming the logical value "1" for the duration of a predetermined time width (a time interval corresponding to the maximum measuring distance), is applied to a data terminal D of the flip-flop circuit 19. In this case, if the magnitude of the detection signal d is between the detection levels $L_1$ and $L_2$ when the signal e is at the "1" level, the integration command signal i generated from the flip-flop circuit 19 goes to "1" in response to the output of the logical circuit 18. On the contrary, when the detection signal d is either below the detection level $L_1$ of the comparator 15 or higher than the detection level $L_2$ of the comparator 16, the integration command signal i does not go to 37 1". When one or the other of the outputs of the comparators 15 and 16 (the output of the comparator 15 in this case) is then applied to the computing circuit 12, the flip-flop circuit 20 is set and the flip-flop circuit 20 is reset by the transmission command signal a applied through the terminal 51. Consequently, the flip-flop circuit 20 generates a pulse signal of the time width t corresponding to the distance between the ultrasonic transmitter 1 and the receiver 2 and the road surface 14 and this pulse signal is applied to the control terminal of the gate circuit 21. The clock pulses applied to the gate circuit 21 through a terminal 111 constitute a clock pulse train f corresponding to the distance between the ultrasonic transmitter 1 and the receiver 2 and the road surface 14, and this clock pulse train f is counted and stored by the counter 32 of the memory circuit 22. On the other hand, the output signal of the one-shot circuit 31 generated in response to the transmission command signal a is at "1" and consequently no clock pulses are applied to the counter 33. Thereafter, when the output signal g of the one-shot circuit 31 goes to "0", clock pulses h are applied through the gate circuit 35 to the counter 33 until its count value becomes equal to the output of the counter 32. On the other hand, only when the output signal i of the flip-flop circuit 19 in the signal selection circuit 10 goes to "1", that is, only when the "proper" data for performing a computation is applied, the clock pulses h are passed through the gate circuit 23 and the resulting signals j are counted and stored by the counter 25. The gate circuit 24 generates a signal k indicative of the application of the "proper" data, and signals k are counted and integrated by the counter 26.

Figure 3:
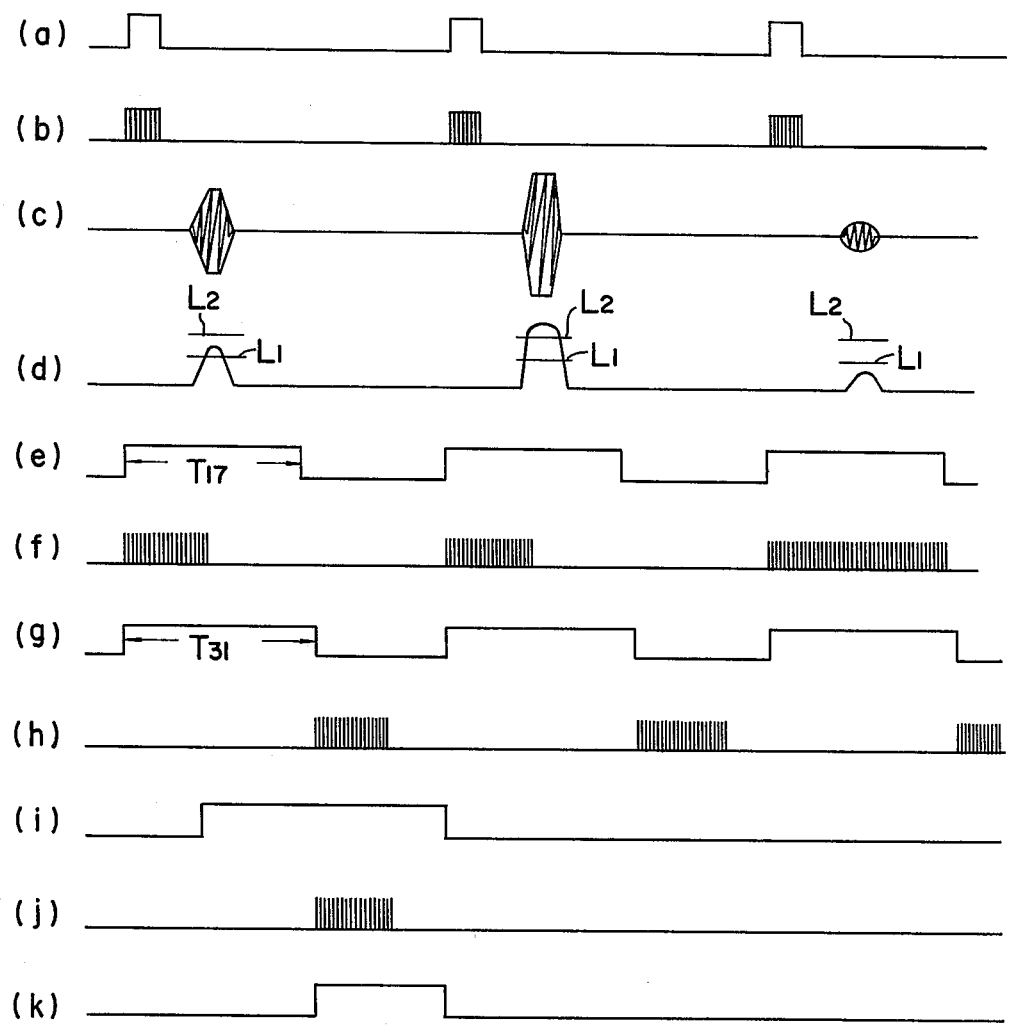
FIG. 3 is a signal waveform diagram useful in explaining the operation of the apparatus of this invention.

On the other hand, as shown by the signal waveform diagram of FIG. 3, when the magnitude of the detection signal d is higher than the predetermined detection levels $L_1$ and $L_2$ and thus the signal is not between the detection levels $L_1$ and $L_2$, the logic circuit 18 does not change the output signal i of the flip-flop circuit 19 and the signal i remains at "1". Thus, the computing circuit 12 ascertains that it has received a data which is "improper" to operate on, with the result that both of the gate circuits 23 and 24 are closed and the clock pulses h and the pulse signal g are respectively not passed through the gate circuits 23 and 24, thus causing the gate outputs j and k to remain at "0". On the other hand, when the detection signal d is lower than the detection levels $L_1$ and $L_2$, the gate outputs j and k also remain at "0" in the similar manner as mentioned previously.

When the output signals k of the gate circuit 24 are counted and integrated by the counter 26 so that the integrated value of the counter 26 reaches a predetermined value, the signal generating circuit 27 generates and applies a latch signal to the display circuit 13 through a terminal 121 and simultaneously the averaging circuit 28 divides the integrated value of the counter 25 according to the output of the counter 26. Consequently, the output average value for one cycle of data integration is applied to the display circuit 13 through a terminal 122 and consequently the display circuit 13 stores and displays the output average value as an average distance to the road surface 14 in response to the latch signal. A moment later, the signal generating circuit 27 generates a reset signal and resets the counters 25 and 26. The distance measuring operation is started again in response to the next transmission command signal a.

With this embodiment, the comparators 15 and 16 are designed so that whether a detection signal d is proper or improper as a detection data is determined in accordance with the detection levels $L_1$ and $L_2$ and data is obtained selectively thus reducing the measurement error due to the road surface conditions and thereby improving the measuring accuracy, and the detection levels $L_1$ and $L_2$ will be determined in consideration of the average surface conditions of the ordinary roads, the directivity, sensitivity and finite transmission and receiving area (region) of the transmitter 1 and the receiver 2, their mounting positions relative to the road surface, the ordinary vehicle speed, vehicle vibration, etc.

A test was conducted by mounting the ultrasonic transmitter 1 and the receiver 2 on the axle of an automobile, using an ultrasonic frequency of 38 kHz, presetting to select from the reflected ultrasonic waves from the road surface those waves having sound pressures higher than 0.5 $\mu$Bar, integrating $10^4$ units of the thus obtained measured distance data for averaging purposes and then measuring the distance between the automobile axle and the road surface on the basis of the resulting average value, and the measuring accuracy obtained was $\pm 10^{-3}$ m. In this case, the averaging was effected over the relatively long unit time (at intervals of one minute), and the resulting measuring accuracy was comparatively high without being affected by the surface conditions of any particular portions of the road. Another test conducted by mounting the transmitter 1 and the receiver 2 on the vehicle body instead of the axle also showed the similar measuring accuracy as mentioned previously owing to the averaging of the measuring data, although the vibration characteristic was not the same as in the case of the axle.

Figure 4:
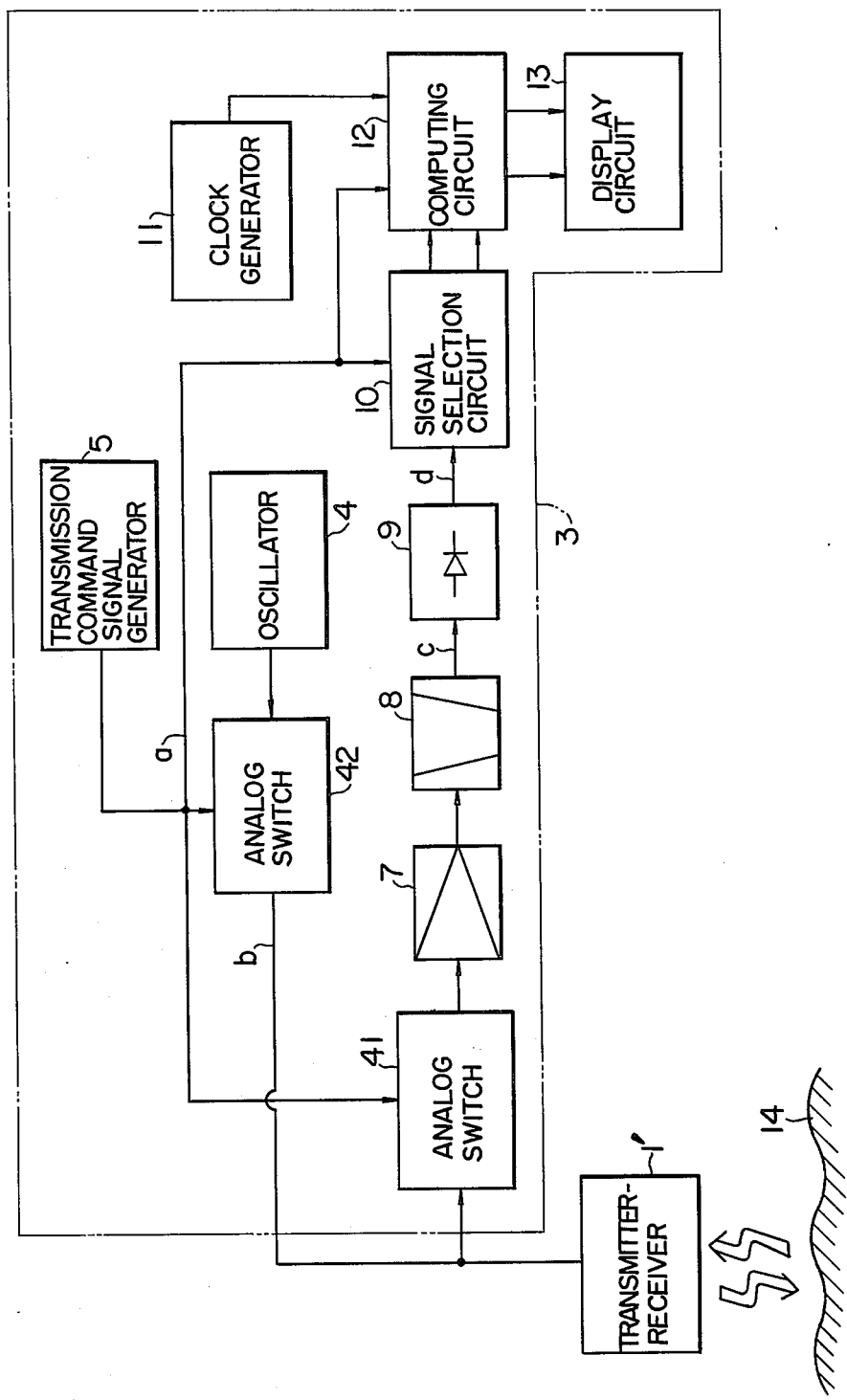
FIG. 4 is a block diagram showing another embodiment of the apparatus of the invention.

Referring now to FIG. 4, there is illustrated another embodiment of the invention which differs from the embodiment of FIG. 1 in that analog switches 41 and 42 are respectively connected to the input and output of an ultrasonic transmitter and receiver 1' and that the opening and closing of the analog switches 41 and 42 are controlled in response to a transmission command signal a, thus requiring only the transmitter-receiver 1' which serves as a transmitter and a receiver and thereby reducing the space required for mounting. In operation, when a transmission command signal a is generated, the analog switch 41 is not actuated and the analog switch 42 is actuated and consequently the transmitter-receiver 1' transmits an ultrasonic wave in response to the output of the oscillator 4. Thereafter, when the transmission command signal a is terminated, the analog switch 42 is brought out of operation and the analog switch 41 is actuated and the reflected ultrasonic wave from the road surface 14 is received and supplied to the succeeding circuits. The reflected wave is then subjected to detection processing in the similar manner as in the previously mentioned embodiment. Microwave, for example, may be used as the required wave signal in place of the ultrasonic wave.

Next, some applications of the distance measuring apparatus according to the invention will be described. To use the apparatus in detecting an abnormal tire air pressure, it is necessary to mount at least two sets of transmitter and receiver, one on the front wheel axle and the other on the rear wheel axle, effect the same distance measuring operation as mentioned previously on the output of each transmitter and receiver set and then compare the output of the averaging circuit 28 shown in FIG. 2 with a predetermined irregularity warning value (a value corresponding to the height of the axle from the road surface when the air pressure drops below a predetermined value) to thereby ascertain the existence of an abnormal air pressure. In this case, it is only necessary to provide a single distance measuring circuit so that the outputs of the two sets of transmitter and receiver may be alternately received to subject them to detection processing at desired intervals. On the other hand, the apparatus may be used in controlling the optical axis of the head lamps by mounting at least two sets of transmitter and receiver, one on the front part and the other on the rear part of the vehicle body or one on the front wheel axle and the other on the rear wheel axle along the center line of the automobile, effecting the same distance measuring operation as mentioned previously on the output of each transmitter and receiver set, detecting from the two measured distance data the inclination of the automobile relative to the road surface in the direction of movement of the automobile and then moving the optical axis of the head lamps by a motor to provide the proper value in consideration of the illuminating distance, range or brightness in the front of the automobile, the road conditions, the approaching car, etc.

It will thus be seen that in accordance with the apparatus of this invention, the distance of a preselected portion of an automobile to the road surface is measured by transmitting wave signals toward the road surface from the preselected portion of the automobile, selecting only the reflected waves of a predetermined intensity from the received reflected waves from the road surface and then integrating and averaging the data of the distance to the road surface obtained from the selected reflected waves, and the apparatus has a remarkable advantage of greatly eliminating the deterioration of measuring accuracy due to variation in the intensity of the reflected waves caused by the road surface conditions and thereby making it possible to measure with a high degree of accuracy the distance between the road surface and one end of the automobile in motion. Thus, the apparatus of this invention can be used in wide applications, such as, detection of the height, inclination, etc., of an automobile.

We claim:

1. An automobile distance measuring apparatus comprising:
   means mounted on a desired portion of an automobile in opposition to a road surface for transmitting wave signals toward said road surface and receiving reflected wave signals from said road surface;
   oscillator means responsive to a transmission command signal for intermittently applying a drive signal to said transmitting and receiving means, causing said transmitting and receiving means to intermittently transmit wave signals toward said road surface;
   a signal selecting means for receiving the reflected wave signals from said transmitting and receiving means and selecting from said reflected wave signals only wave signals of a predetermined intensity;

means for generating a plurality of groups of pulses, the number of pulses in each group being related to the time between each said transmission command signal and each of said selected wave signals;

first means for counting the number of pulses in a plurality of said groups;

second means for counting the number of said groups having pulses which are counted by said first means; and means for averaging the number of pulses counted in said first means over the number of groups counted by said second means when said second means counts a predetermined number of said groups so as to generate automobile to road surface distance data, said first counting means integrating said data, and said averaging means averaging said data over said predetermined number.

2. An apparatus for measuring distances between a vehicle body and a road surface comprising:

command means for producing a command pulse;

means for transmitting a wave signal from a vehicle body toward a road surface in response to said command pulse and receiving a reflected wave signal reflected by said road surface;

first comparison means for comparing the magnitude of said reflected wave signal with a predetermined first level;

second comparison means for comparing the magnitude of said reflected wave signal with a predetermined second level higher than said predetermined first level;

discrimination means for discriminating whether the magnitude of said reflected wave signal is above an below said predetermined first and second levels, said discrimination means producing a discrimination output pulse indicative of the magnitude of said reflected wave signal being above and below said predetermined first and second levels;

detection means for detecting a time interval in which said wave signal is transmitted and said reflected wave signal is received by said transmitting and receiving means, said detection means producing a detection pulse having said time interval starting in response to said command pulse and ending in response to the output signal of said first comparison means indicative of the magnitude of said reflected wave signal being above said predetermined first level;

clock means for producing clock pulses at a fixed frequency;

gate means for passing said clock pulses while said detection output pulse is produced;

first counter means for counting said clock pulses passing through said gate means;

second counter means for counting said discrimination output pulse;

averaging means for averaging the output count value of said first counter means when the output count value of said second counter means reaches a predetermined value; and utilization means for utilizing the output average value of said averaging means.

* * * * *